United States Patent [19]

Hanson

[11] Patent Number: 5,802,149
[45] Date of Patent: Sep. 1, 1998

[54] ON-LINE TRAINING OF AN AUTOMATED-DIALING DIRECTORY

[75] Inventor: Thomas C. Hanson, Boulder, Colo.

[73] Assignee: Lucent Technologies Inc., Murray Hill, N.J.

[21] Appl. No.: 628,205

[22] Filed: Apr. 5, 1996

[51] Int. Cl.⁶ ................................................. H04M 1/64
[52] U.S. Cl. ........................... 379/89; 379/213; 379/355; 455/412
[58] Field of Search .......................... 379/67, 88, 89, 379/213, 216, 355, 356; 455/412, 413

[56] References Cited

U.S. PATENT DOCUMENTS

| 4,933,968 | 6/1990  | Iggulden        | 379/216 |
| 4,979,206 | 12/1990 | Padden et al.   | 379/67  |
| 5,297,183 | 3/1994  | Bareis et al.   | 379/59  |
| 5,369,685 | 11/1994 | Kero            | 379/67  |
| 5,452,340 | 9/1995  | Engelbeck et al.| 379/67  |
| 5,488,652 | 1/1996  | Bielby et al.   | 379/88  |
| 5,509,049 | 4/1996  | Peterson        | 379/212 |

OTHER PUBLICATIONS

R. Grigonis et al., *Tapi at the Windows 95 Starting Gate*, Computer Telephony, vol. 3, Issue 9, Sep. 1995, pp. 96–97.
IBM Technical Disclosure Bulletin, "Mechanism to Automate Updating Obsolete Telephone Numbers", vol. 37, No. 04A, Apr. 1994, pp. 115–116.

*Primary Examiner*—Fan S. Tsang
*Attorney, Agent, or Firm*—David Volejnicek

[57] ABSTRACT

Directory assistance (106) is used to train a voice-dialing system (107) as a part of normal voice-dialing activities, thereby avoiding the need for a separate training session. The voice-dialing system connects a caller to directory assistance when a voice-dialing attempt by the caller does not match any voice tags in the caller's voice-dialing directory (130) and the caller signals a desire to use directory assistance. The voice-dialing system monitors the call to directory assistance, and captures and stores the telephone number provided by directory assistance to the caller. After the directory assistance call is completed, the voice-dialing system asks the caller to repeat the voice tag for the telephone number, forms a data representation of the voice tag from multiple received instances of the voice tag, records the data representation of the voice tag along with the captured telephone number in the caller's voice-dialing directory, and at the caller's option initiates a call to the telephone number. As a result, future calls to this telephone number can be made via voice dialing, and without use of directory assistance.

14 Claims, 3 Drawing Sheets

ON-LINE TRAINING OF AN AUTOMATED-DIALING DIRECTORY

TECHNICAL FIELD

This invention relates to telecommunications systems in general, and to automated directory and automated dialing systems in particular.

BACKGROUND OF THE INVENTION

Automated voice-controlled directory-assistance systems are known in the art. A customer requesting directory assistance is connected to an automatic speech-recognition unit (ASRU) and is prompted to speak commands for identifying the requested directory number. The ASRU converts the speech signals received from the customer into data signals for searching a directory-number data base. If a directory listing is located, the number of that listing is announced to the customer and the customer is automatically prompted to speak a command indicating whether a call to that number should be automatically established. The telecommunications switching network responds to a positive command by automatically establishing the call connection. An illustrative example of such a system is disclosed in U.S. Pat. No. 4,979,206.

Also known is a voice-dialing feature for mobile telephone systems. The mobile telephone switching office (MTSO), or an adjunct thereof, has a directory database for each mobile telephone customer who is a subscriber of the feature, which contains a plurality of telephone numbers and data representations of their corresponding voice tags (spoken words). The subscriber trains (programs) the directory database during a training session by entering the telephone numbers and speaking their corresponding tags into the system. Thereafter, to make a call, the subscriber establishes a radiotelephone connection to the MTSO and speaks the tag of the desired call destination. The MTSO converts the spoken tag into a data representation thereof and matches it against the data representations of voice tags in the directory database. Upon finding a match, the MTSO establishes a call connection to the corresponding number. If no match is found, the MTSO informs the subscriber and prompts the subscriber to either speak the tag again or speak another tag.

Because a subscriber of voice dialing must train the system prior to use, the subscriber is required to know the community of interest—the desired call destinations—ahead of time. If the subscriber elects to call a destination that has not been trained into the system, voice dialing fails. Of course, the subscriber may then bypass voice dialing and use directory assistance to get, and optionally also to dial, the desired destination's number, or the subscriber may dial the destination's number manually. But the fact remains that the voice dialing has failed in that instance, and will fail again the next time that destination is called. Any training of the voice-dialing feature to effect a wider or newer community of interest requires an interruption of on-line (normal calling) activities—an off-line training session. For subscribers, this is a bother which they often choose to avoid. Therefore, voice dialing is not used as widely as it potentially could be.

SUMMARY OF THE INVENTION

This invention is directed to solving these and other disadvantages of the prior art. Generally according to the invention, directory assistance is used to train an automated-dialing system (e.g., a voice-dialing system) as a part of normal calling (e.g., voice dialing) activities, thereby avoiding the need for a separate training session. Illustratively, a voice-dialing system connects a caller to directory assistance when a voice-dialing attempt by the caller does not match any voice tags in the caller's voice-dialing directory and optionally if the caller further indicates a desire to use directory assistance. The voice-dialing system monitors the call to directory assistance, and captures and stores the telephone number provided by directory assistance to the caller. After the directory assistance call is completed, the voice-dialing system preferably asks the caller to repeat the voice tag for the number, records the voice tag along with the captured telephone number in the caller's voice-dialing directory, and at the caller's option initiates a call to the telephone number. As a result, future calls to this telephone number can be made via voice dialing, and without use of directory assistance.

Specifically according to one aspect of the invention, an automated-dialing system—for example, a voice-dialing system—that comprises an automated-dialing directory—for example, a voice-dialing directory—for storing addresses (e.g., telephone numbers) and their associated tags, means for connecting the system to a caller, means for receiving a tag of a desired call destination provided—for example, spoken—by a connected caller, and means responsive to receipt of the tag for searching the directory for the tag, further comprises means responsive to the searching means not finding the tag in the directory for connecting the caller and the system to directory assistance, means responsive to directory assistance providing an address of the desired call destination to the caller for receiving the address from directory assistance, means for causing the address and the tag to be stored by the directory, and preferably also means for initiating communication (e.g., initiating call-connection establishment) to the address for the caller. As a result, the system becomes "trained" for this destination, and future calls to this destination can be made via conventional automated (e.g., voice) dialing.

Specifically according to another aspect of the invention, a method of training an automated-dialing system that comprises the steps of connecting the system to a caller, receiving at the system a tag of a desired call destination provided by the caller, and searching a directory for the received tag, further comprises the steps of connecting the caller and the system to directory assistance in response to not finding the tag in the directory, receiving the address (e.g., telephone number) of the desired call destination at the system from directory assistance in response to directory assistance providing the address to the caller, storing the address and the tag in the directory, and preferably also initiating communication to the address for the caller.

The invention increases the value and usefulness of automated dialing, and primarily of voice dialing, by automatically updating the automated-dialing directory as a part of normal calling activities, without a need for training sessions. By thus easing the process of training an automated-dialing system, the invention eliminates the bother that interferes with wider use of automated dialing.

These and other advantages and features of the invention will become more apparent from the following description of an illustrative embodiment of the invention taken together with the drawing.

DETAILED DESCRIPTION

Figure 1:
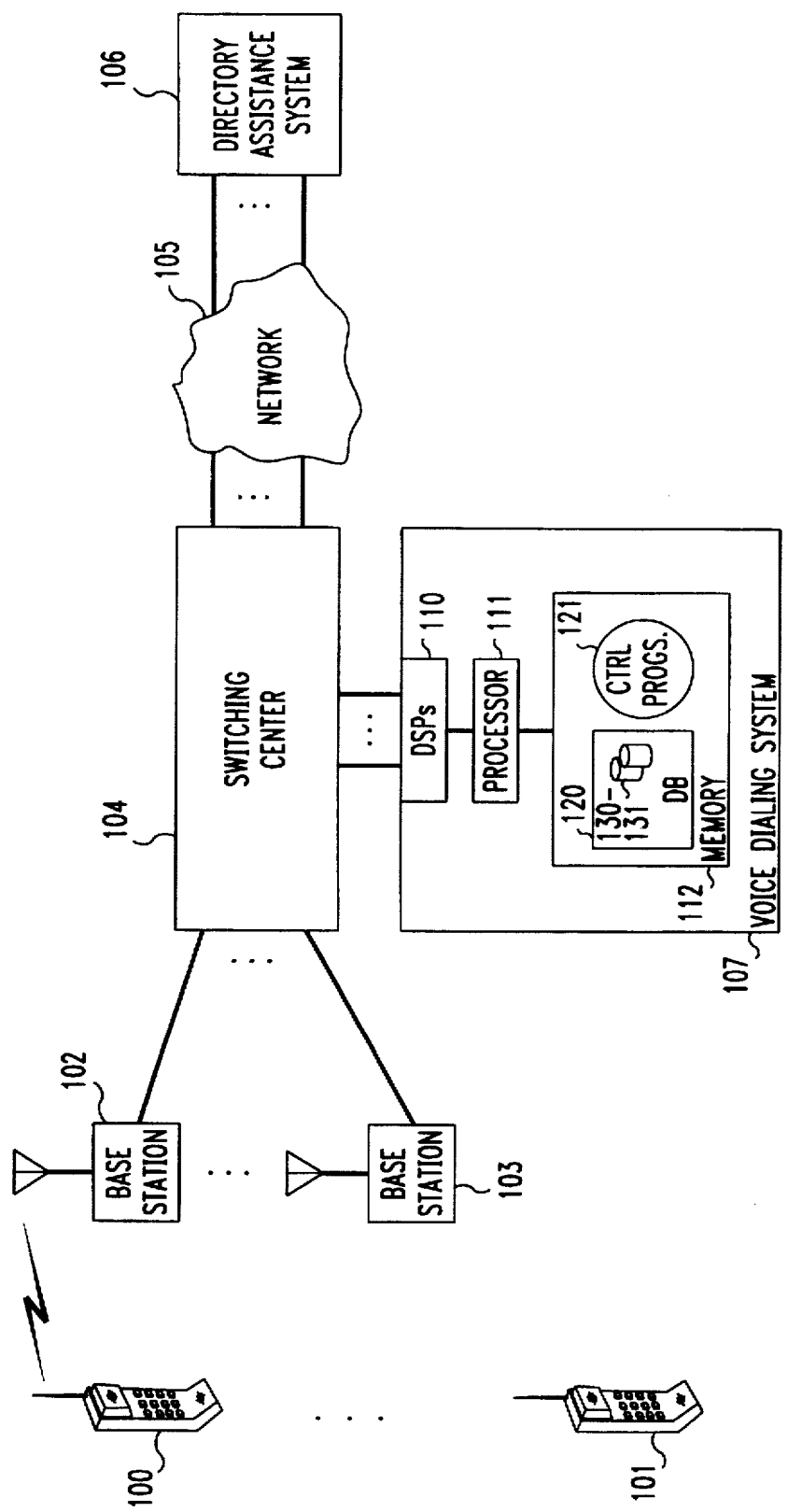
FIG. 1 is a block diagram of a telecommunications system that includes an illustrative embodiment of the invention.

FIG. 1 shows a telecommunications system comprising a plurality of portable telephones 100–101 selectively connected via radiotelephone/wireless connections to base stations 102–103 and therethrough to a switching center 104 (e.g., a mobile telephone switching office, or MTSO). Illustratively, units 100–104 are elements of a conventional cellular radiotelephone system or a conventional wireless personal communications system (PCS). Alternatively, conventional wireline telephones, telephone lines, and either a private branch exchange (PBX) or a telephone central office may be substituted respectively for telephones 100–101, wireless connections and base stations 102–103, and switching center 104.

Switching center 104 is connected through a telephone network 105 to a directory-assistance system 106. System 106 is illustratively an automated voice-controlled directory-assistance system such as is described in the abovementioned U.S. Pat. No. 4,979,206. Alternatively, system 106 is an operator position system (OPS) staffed by operators.

A voice-dialing system 107 that is connected as an adjunct processor to switching center 104 provides users of telephones 100–101 with voice-dialing capability. Voice-dialing system 107 is illustratively an interactive voice-response unit (IVRU) such as the Lucent Technologies Inc. Conversant® system. System 107 is a stored-program-controlled unit that includes a processor 111 for executing control programs 121 which are stored in a memory 112. For purposes of voicing information to users of telephones 100–101 and recognizing the users' spoken commands, system 107 is connected to switching center 104 (and therethrough selectively to telephones 100–101 and directory-assistance system 106) by digital signal processors (DSPs) 110. For providing the voice-dialing feature, system 107 has stored in memory 112 a database of voice-dialing directories 130–131, each for a different user. Each directory 130–131 contains one or more entries each comprising a telephone number and a corresponding voice tag. The voice tag is a data representation of a spoken word or words which the user has selected to associate as an identifier with the telephone number.

As described so far, the system of FIG. 1 is conventional.

Figure 2:
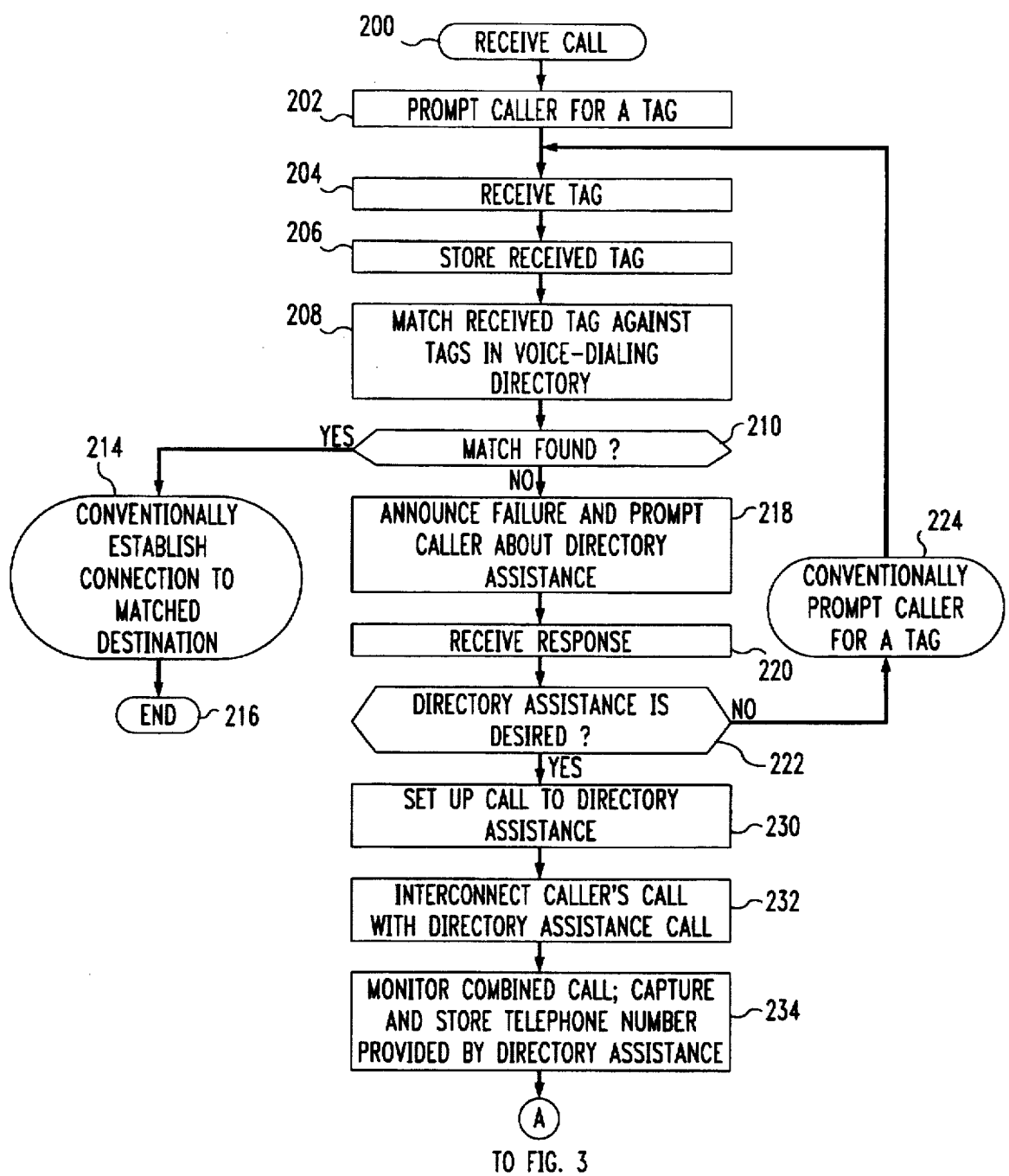
FIGS. 2–3 are a function flow diagram of operation of the voice-dialing system of the telecommunications system of FIG. 1.
Figure 3:
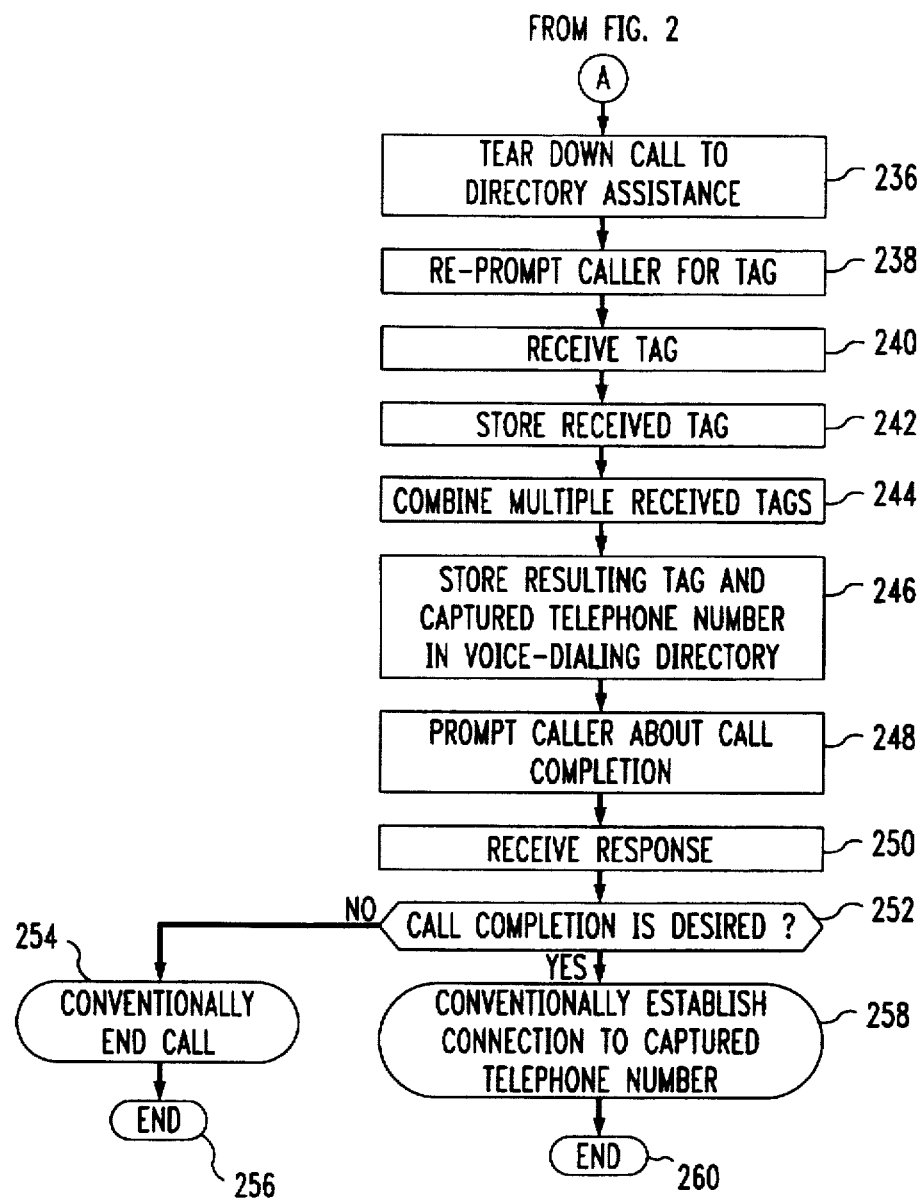

According to the invention, control programs 121 of voice-dialing system 107 include programs that implement the functionality shown flowcharted in FIGS. 2–3.

When a user of a telephone 100 initiates a call, switching center 104 connects the caller to voice-dialing system 107 either automatically or selectively in response to the caller's call-initiation signaling, in a conventional manner. Upon becoming connected to the caller, at step 200 of FIG. 2, system 107 prompts the caller to voice—to speak—the tag of the desired destination, that is, of the telephone number that the caller wishes to call, at step 202. Upon receipt of the tag, at step 204, system 107 stores the received tag, at step 206, and then searches the caller's voice-dialing directory 130 in an attempt to match the received tag with one of the tags stored in voice-dialing directory 130, at step 208. The looked-for match could be either an exact match, or an inexact match that reaches some predetermined threshold of correlation (i.e., some threshold of probability of being correct). If a match is found, as determined at step 210, system 107 proceeds conventionally, at step 214, to cause switching center 104 to establish a call connection for the call to the tag's corresponding stored telephone number. Involvement of system 107 in the call then ends, at step 216.

If it is determined at step 210 that the tag that was received from the caller at step 204 does not match any of the tags that are stored in the caller's voice-dialing directory 130, system 107 announces to the caller that the tag was not recognized and prompts the caller to indicate whether he or she wants directory assistance, at step 218. Upon receipt of the caller's response, at step 220, system 107 checks whether directory assistance is requested, at step 222. If not, system 107 proceeds conventionally, at step 224, by asking the caller to either repeat the tag or to speak a new tag. Operation of system 107 then returns to step 204.

If directory assistance is requested, system 107 causes switching center 104 to set up a call from system 107 to directory-assistance system 106, at step 230. System 107 is either pre-programmed with the telephone number of directory-assistance system 106 and provides this number to switching center 104, or merely commands switching center 104 to connect to directory assistance and leaves it up to switching center 104 to determine how to reach directory assistance. System 107 then connects the directory-assistance call to system 106 to the caller, at step 232. The caller interacts with system 106 in a conventional manner to obtain the number of the desired call destination. System 107 monitors the interaction on the call to system 106, and when system 106 returns (e.g., speaks and/or signals) the desired number to the caller, system 107 captures and stores the number in a temporary storage location, at step 234. System 107 then causes switching center 104 to tear down the call from system 107 to directory-assistance system 106, at step 236 of FIG. 3. Preferably, system 107 now retrieves the tag that it stored at step 206, uses it to prompt the caller at least once to speak this tag again, at step 238, and upon each receipt of the spoken tag, at step 240, stores the received tags in a temporary storage location, at step 242. The reason for prompting the caller to repeat the tag is to obtain multiple samples of the tag in order to form a better data representation of the tag. System 107 then combines the multiple ones of the temporarily-stored tags to form a final data representation of the voice tag, at step 244, and stores this resulting voice tag and the number that it obtained at step 234 as an entry in the caller's voice-dialing directory 130, at step 246. Directory 130 thus becomes trained for voice-dialing of this number as a part of normal calling activities. System 107 then asks the caller if he or she wants to complete the call to this number, at step 248. Upon receiving the caller's response, at step 250, system 107 checks whether it is affirmative or negative, at step 252. If it is negative, system 107 proceeds conventionally, at step 254, to cause switching center 104 to end the call, and then also ends its involvement in the call, at step 256. If the answer is affirmative, system 107 proceeds conventionally, at step 258, to cause switching center 104 to establish a call connection for the caller to the telephone number. Involvement of system 107 in the call then ends, at step 260.

Of course, various changes and modifications to the illustrative embodiment described above will be apparent to those skilled in the art. For example, the invention may just as well be used to train a non-voice automatic-dialing system, such as a private directory of a personal computer-implemented "soft phone" wherein the user types on the computer's keyboard a mnemonic tag for a desired call destination and a call is automatically made by the computer to the destination's corresponding telephone number. In this environment, a failure by the computer to find the mnemonic tag in the private directory would result in the computer automatically calling directory assistance, enabling the user to interact with directory assistance to obtain the desired telephone number, capturing the number provided by the directory assistance, storing the captured number and its tag in the private directory, and calling the captured number. Such changes and modifications can be made without departing from the spirit and the scope of the invention and without diminishing its advantages. It is therefore intended that such changes and modifications be covered by the following claims.

The invention claimed is:

1. A method of training an automated-dialing system, comprising the steps of:
connecting the automated-dialing system to a caller;
receiving a tag of a desired call destination provided by the caller, at the automated-dialing system;
searching an automated-dialing directory for the received tag;
in response to not finding the tag in the automated-dialing directory, connecting the caller and the automated-dialing system to a directory assistance;
in response to the directory assistance providing an address of the desired call destination to the caller, automatically without involvement of the caller receiving the address from the directory assistance at the automated-dialing system; and
automatically without involvement of the caller storing the address and storing the tag in the automated-dialing directory.

2. The method of claim 1 wherein:
the automated-dialing system is a voice-dialing system;
the automated-dialing directory is a voice-dialing directory; and
the step of receiving a tag comprises the step of receiving a tag spoken by the caller.

3. The method of claim 1 further comprising the step of:
the automated-dialing system initiating communication to the address for the caller.

4. The method of claim 1 wherein:
the step of connecting the caller and the automated-dialing system to a directory assistance comprises the steps of
in response to not finding the tag in the automated-dialing directory, giving the caller a choice of being connected to the directory assistance; and
in response to the caller choosing to be connected to the directory assistance, connecting the caller and the automated-dialing system to the directory assistance.

5. The method of claim 1 wherein:
the step of connecting the caller and the automated-dialing system to a directory assistance comprises the steps of
establishing a call from the caller through the automated-dialing system to the directory assistance; and
monitoring the call at the automated-dialing system for the address provided by the directory assistance.

6. The method of claim 2 wherein:
the step of storing comprises the steps of prompting the caller to speak the tag again;
receiving the tag spoken again by the caller, at the voice-dialing system;
forming a data representation of the tag from the received plural ones of the received spoken tags; and
automatically without involvement of the caller storing the address and the data representation of the tag in the voice-dialing directory.

7. An automated-dialing system comprising:
an automated-dialing directory for storing addresses and their associated tags;
means for connecting the automated-dialing system to a caller, for receiving a tag of a desired call destination provided by a connected said caller;
means responsive to receipt of the tag, for searching the automated-dialing directory for the tag;
means responsive to the searching means not finding the tag in the automated-dialing directory, for connecting the caller and the automated-dialing system to a directory assistance;
means responsive to the directory assistance providing an address of the desired call destination to the caller, for automatically without involvement of the caller receiving the address from the directory assistance; and
means for automatically without involvement of the caller causing the address and causing the tag to be stored by the automated-dialing directory.

8. The system of claim 7 wherein:
the automated-dialing system is a voice-dialing system;
the automated-dialing directory is a voice-dialing directory; and
the means for receiving a tag comprise means for receiving a tag spoken by the connected said caller.

9. The automated-dialing system of claim 7 further comprising:
means for initiating a communication to the address for the caller.

10. The automated-dialing system of claim 7 wherein:
the means for connecting the caller and the automated-dialing system to a directory assistance comprises
means responsive to not finding the tag in the automated-dialing directory, for giving the caller a choice of being connected to the directory assistance; and
means responsive to the caller choosing to be connected to the directory assistance, for causing the caller and the automated-dialing system to become connected to the directory assistance.

11. The automated-dialing system of claim 7 wherein:
the means for connecting the caller and the automated-dialing system to a directory assistance comprises
means for causing a call to be established from the caller through the automated-dialing system to the directory assistance; and
the means for receiving the address from the directory assistance comprises
means for monitoring the call for the address provided by the directory assistance.

12. The voice-dialing system of claim 9 wherein:
the means for causing the address and the tag to be stored comprise
means for prompting the caller to speak the tag again;
means responsive to receipt by the tag-receiving means of the tag spoken again by the caller, for forming a data representation of the tag from plural ones of the received spoken tags; and
means for automatically without involvement of the caller causing the address and the data representation of the tag to be stored by the voice-dialing directory.

13. A method of training an automated-dialing system, comprising the steps of:

connecting the automated-dialing system to a caller;

receiving a tag of a desired call destination provided by the caller, at the automated-dialing system;

searching an automated-dialing directory for the received tag;

in response to not finding the tag in the automated-dialing directory, giving the caller a choice of being connected to a directory assistance;

in response to the caller choosing to be connected to the directory assistance, connecting the caller and the automated-dialing system to the directory assistance;

monitoring the call at the automated-dialing system for an address provided by the directory assistance;

in response to the directory assistance providing the address of the desired call destination to the caller, the automated-dialing system automatically capturing the address provided by the directory assistance;

prompting the caller to provide the tag again;

receiving the tag provided again by the caller, at the automated-dialing system;

forming a tag for the address from the received plural ones of the received tags;

automatically without involvement of the caller storing the address and the formed tag in the automated-dialing directory;

giving the caller a choice of being connected to the address; and in response to the caller choosing to be connected to the address, the automated-dialing system initiating a communication to the address for the caller.

14. An automated-dialing system comprising:

an automated-dialing directory for storing addresses and their associated tags;

means for connecting the automated-dialing system to a caller, for receiving a tag of a desired call destination provided by a connected said caller;

means responsive to receipt of the tag, for searching the automated-dialing directory for the tag;

means responsive to the searching means not finding the tag in the automated-dialing directory, for giving the caller a choice of being connected to a directory assistance;

means responsive to the caller choosing to be connected to the directory assistance, for causing the caller and the automated-dialing system to become connected to the directory assistance;

means for automatically without involvement of the caller receiving an address from the directory assistance, including means for monitoring the call for an address provided by the directory assistance, and means responsive to the directory assistance providing the address of the desired call destination to the caller, for capturing the provided address;

means for prompting the caller to provide the tag again;

means responsive to receipt by the tag-receiving means of the tag provided again by the caller, for forming a tag for the address from plural ones of the received tags;

means for automatically without involvement of the caller causing the address and the formed tag to be stored in the automated-dialing directory;

means for giving the caller a choice of being connected to the address; and means responsive to the caller choosing to be connected to the address, for initiating a communication to the address for the caller.

* * * * *